United States Patent
Kim et al.

(10) Patent No.: US 6,765,428 B2
(45) Date of Patent: Jul. 20, 2004

(54) CHARGE PUMP DEVICE FOR SEMICONDUCTOR MEMORY

(75) Inventors: Sun Min Kim, Seoul (KR); Jong-Hoon Park, Kyungki-Do (KR)

(73) Assignee: Hynix Semiconductor, Inc., Kyoungki-Do (KR)

( * ) Notice: Subject to any disclaimer, the term of this patent is extended or adjusted under 35 U.S.C. 154(b) by 0 days.

(21) Appl. No.: 10/028,686

(22) Filed: Dec. 28, 2001

(65) Prior Publication Data

US 2002/0084833 A1 Jul. 4, 2002

(30) Foreign Application Priority Data

Dec. 30, 2000 (KR) .......................................... 2000-87289

(51) Int. Cl.[7] .............................................. H03K 3/01
(52) U.S. Cl. ........................ 327/534; 327/535; 327/536
(58) Field of Search ................................ 327/534, 535, 327/536, 590, 537, 583, 589, 390, 538; 326/226; 365/226

(56) References Cited

U.S. PATENT DOCUMENTS 5,982,222 A * 11/1999 Kyung ........................ 327/536
6,128,242 A * 10/2000 Banba et al. ................ 365/226
6,370,075 B1 * 4/2002 Haeberli et al. ............. 365/226

* cited by examiner

Primary Examiner—Tuan T. Lam
Assistant Examiner—Hiep Nguyen
(74) Attorney, Agent, or Firm—Birch, Stewart, Kolasch & Birch, LLP

(57) ABSTRACT

A charge pump device for supplying a boosted voltage to a memory device includes a charge pump part constructed with first to nth unit charge pumps, and a multi-level detector for detecting a level of a boosted voltage to selectively drive the unit charge pumps in accordance with an amount of power consumption of the host and thereby outputting at least one level detection signal.

8 Claims, 4 Drawing Sheets

US 6,765,428 B2

CHARGE PUMP DEVICE FOR SEMICONDUCTOR MEMORY

RELATED APPLICATION

The present application claims the benefit of Korean Patent Application No. 87289/2000 filed Dec. 30, 2000, which is herein fully incorporated by reference.

BACKGROUND OF THE INVENTION

1. Field of the Invention

The present invention relates to a circuit for generating a boosted voltage in a semiconductor memory, and more particularly, to a charge pump circuit in a semiconductor memory.

2. Discussion of the Related Art

FIG. 1 shows a block diagram of a charge pump device or circuit 50 in a semiconductor memory according to a related art.

Referring to FIG. 1, the charge pump circuit 50 is constructed with a level detector 10 for detecting a level of a boosted voltage VPP by comparing it with a reference voltage VREF and producing a level detection signal DET based on the comparison results, an oscillator 20 for producing a pulse signal PUL in accordance with the level detection signal DET output from the level detector 10, and a charge pump unit 30 for outputting a boosted voltage VPP by carrying out a charge pumping operation in accordance with the pulse signal PUL output from the oscillator 20. The charge pump unit 30 comprises at least one of a plurality of unit charge pumps 30-1 to 30-$n$.

FIG. 2 is a detailed circuit diagram of the level detector 10 in FIG. 1. As shown in FIG. 2, the level detector 10 is constructed with a differential amplifier for comparing the boosted voltage VPP to the reference voltage VREF and outputting the level detection signal DET. A pumping enabling signal PUMP_ON is input to a gate of an NMOS transistor NM3.

The operation of the above-constructed charge pump circuit 50 in a semiconductor memory according to a related art is explained in detail as follows.

When the charge pump circuit 50 is operated by a high level stage of the pumping enabling signal PUMP_ON, the level detector 10 detects a level of the boosted voltage VPP by comparing a VPP level to the reference voltage VREF. Namely, as shown in FIG. 2, if the level of the reference voltage VREF is higher than the level of the boosted voltage VPP, the level detector 10 outputs a level detection signal DET of a high level through an inverter INV. If the level of the reference voltage VREF is lower than the level of the boosted voltage VPP, a level detection signal DET of a low level is output by the level detector 10.

The oscillator 20 operates based on the level detection signal DET output from the level detector 10 to initiate or stop the operation of the unit charge pumps 30-1 to 30-$n$ of the charge pump unit 30. Namely, when the level detection signal DET output from the level detector 10 is at a high level, the VPP level is increased by operating all the unit charge pumps 30-1 to 30-$n$ of the charge pump unit 30. If the level detection signal DET output from the level detector 10 is at a low level, the VPP level is decreased by stopping the operation of all the unit charge pumps 30-1 to 30-$n$.

In this regard, the charge pump circuit of the related art carries out the pumping operation by operating the plurality of the unit charge pumps at once without any regard to whether the device is in a low or high speed operation (low or high power consumption). This results in excessive power consumption by the device since operating all unit charge pumps, even if it is unnecessary, requires a significant amount of energy.

SUMMARY OF THE INVENTION

Accordingly, the present invention is directed to a charge pump circuit or device in a semiconductor memory that substantially obviates one or more problems due to limitations and disadvantages of the related art.

An object of the present invention is to provide a charge pump circuit or device in a semiconductor memory for reducing power consumption by driving selectively a plurality of unit charge pumps in accordance with required power amounts.

Another object of the present invention is to provide a charge pump device and method that is efficient and effective in its operation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a charge pump circuit in a semiconductor memory according to an embodiment of the present invention, includes a charge pump unit constructed with a first to an nth unit charge pumps, a multi-level detector detecting a level of a boosted voltage by multi-steps so as to drive the unit charge pumps variably in accordance with an amount of power consumption of the device, an oscillator producing a pulse signal in accordance with a detect signal of the multi-level detector, and a logic operation part operating the pulse signal of the oscillator and a level detect signal produced from the multi-level detector and outputting the operated signal to the charge pump unit.

Preferably, the multi-level detector includes a voltage distributor dividing a power source voltage into a first to an nth voltage levels, and a first to an nth level detectors detecting the level of the boosted voltage by comparing the boosted voltage to the first to nth voltage levels divided by the voltage distributor.

More preferably, the first unit charge pump is always driven by the detection signal output from the multi-level detector, all of the first to nth unit charge pumps are driven when power is on or the amount of the power consumption is large, and the second unit charge pump is driven when the power consumption is small on an active stage.

In another aspect of the present invention, a charge pump circuit in a semiconductor memory includes a charge pump unit constructed with a first to an nth unit charge pumps, a multi-level detector detecting a level of a boosted voltage by multi-steps so as to drive the unit charge pumps variably in accordance with an amount of power consumption of the device, an oscillator producing a pulse signal in accordance with a detect signal of the multi-level detector, and a logic operation part operating the pulse signal of the oscillator and a level detection signal produced from the multi-level detector, the logic operation part outputting the operated signal to the first to nth unit charge pumps, wherein the multi-level detector comprises a voltage distributor dividing a power source voltage into a first to an nth voltage levels, and a first to an nth level detectors detecting a plurality of levels of the boosted voltage by comparing the boosted voltage to the first to nth voltage levels divided by the voltage distributor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
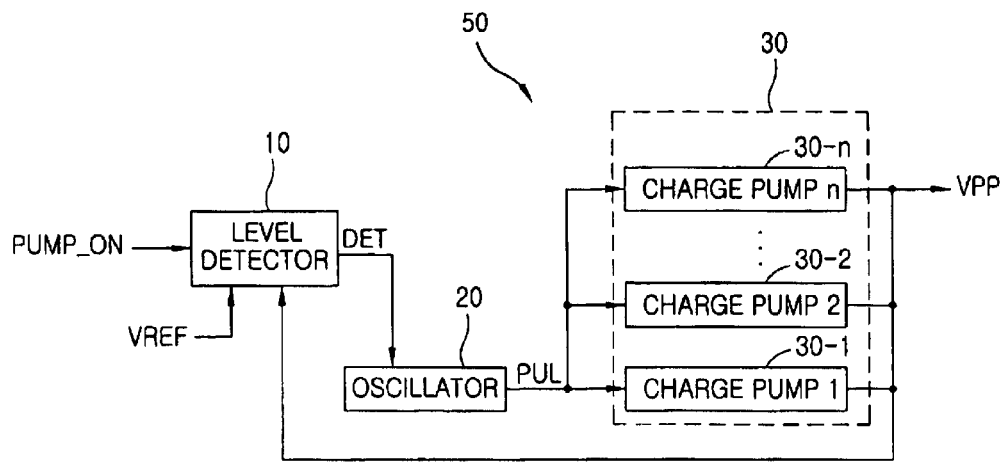
FIG. 1 illustrates a block diagram of a charge pump circuit in a semiconductor memory according to a related art.
Figure 2:
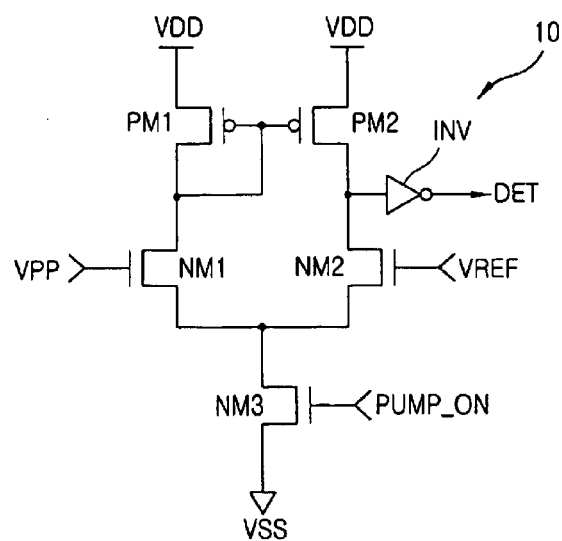
FIG. 2 illustrates a circuit diagram of a level detector in FIG. 1 according to the related art.
Figure 3:
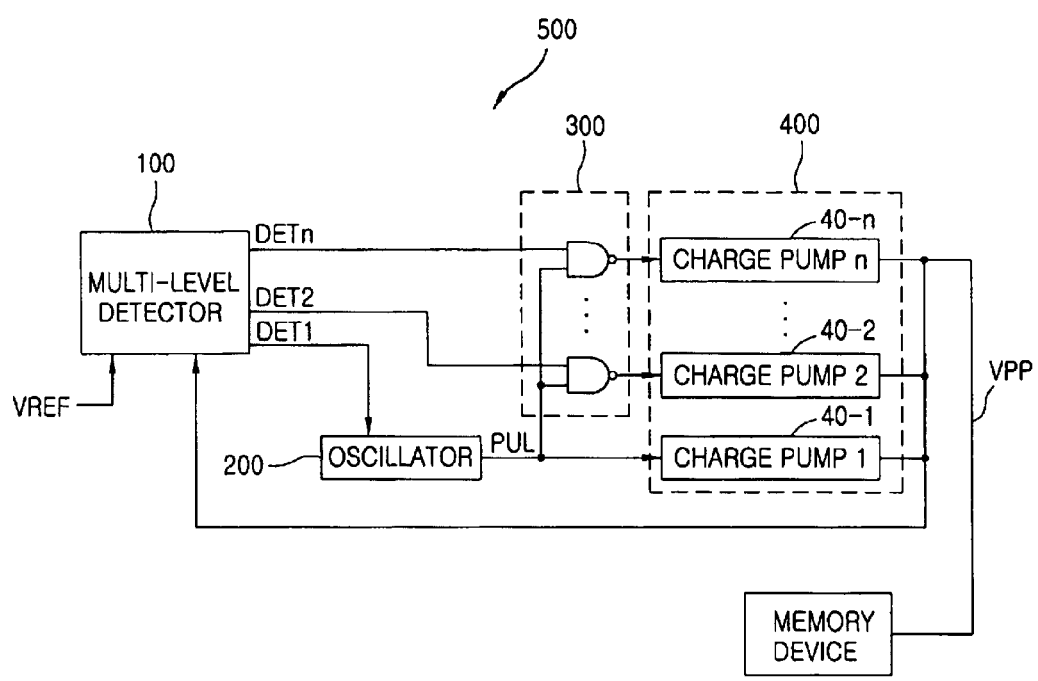
FIG. 3 illustrates a block diagram of a charge pump circuit or device usable in a semiconductor memory according to one embodiment of the present invention.

FIG. 3 illustrates a block diagram of a charge pump circuit or device 500 useable in a semiconductor memory or other applicable areas according to one embodiment of the present invention.

Referring to FIG. 3, the charge pump device 500 is constructed with a multi-level detector 100 for detecting a level of a boosted voltage VPP using multiple steps, an oscillator 200 for producing a pulse signal PUL in accordance with a first level detection signal DET1 detected by the multi-level detector 100, a charge pump part 400, and a logic operation part 300 for driving the charge pump part 400 by NANDing both the pulse signal PUL of the oscillator 200 and second to nth-level detection signals DET2 to DETn detected by the multi-level detector 100. The elements are all operatively connected.

The charge pump part 400 includes a plurality of unit charge pumps 40-1 to 40-n. The first unit charge pump 40-1 of the charge pump part 400 is always turned on or in operation once the pump operation of the device 500 is initiated. But, the second to nth unit charge pumps 40-2 to 40-n are driven selectively based on the amount of power consumption of the device 500. That is, not all the unit charge pumps 40-2 to 40-n may be in operation at a given time.

Figure 4:
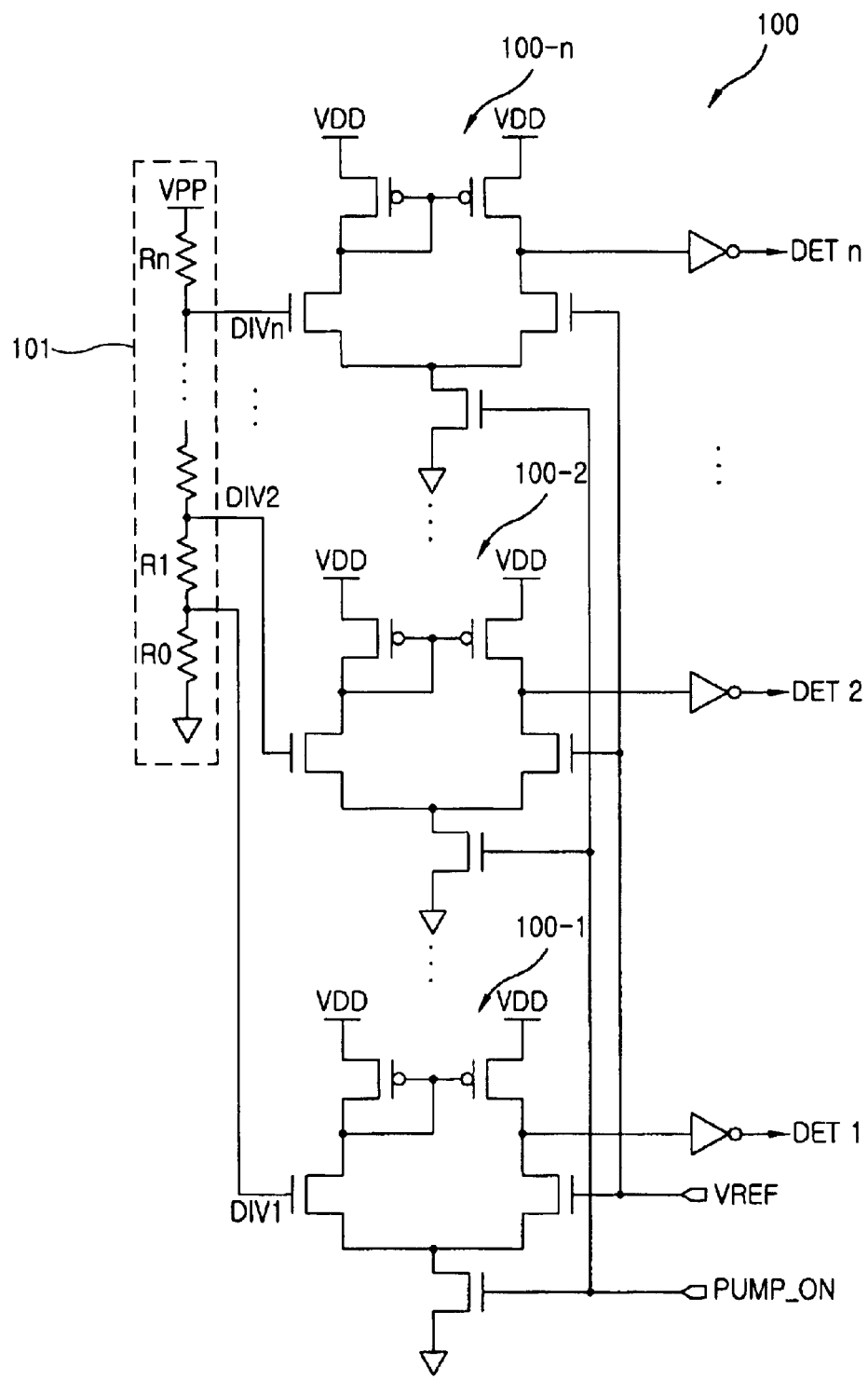
FIG. 4 illustrates a circuit diagram of a level detector in FIG. 3 according to one embodiment of the present invention.

FIG. 4 is a circuit diagram of the multi-level detector 100 in FIG. 3 according to one embodiment of the present invention. As shown in FIG. 4, the multi-level detector 100 is constructed with a voltage distributor 101 for dividing a power source voltage into a plurality of voltage levels DIV1 to DIVn each corresponding to a divided boosted voltage, and a plurality of level detectors 100-1 to 100-n each detecting a level of a divided boosted voltage by comparing the reference voltage VREF to the corresponding one of the divided voltage levels DIV1 to DIVn. A pumping enabling signal PUMP_ON is applied to an NMQS gate in each of the level detectors 100-1 to 100-n, which generates and outputs a level detection signal DET1 . . . DETn based on the level detection results. In this case, the level detectors 100-1 to 100-n are implemented by using a differential amplifier (e.g., composed of PMOS and NMOS transistors) that are preferably not affected by a process variation, temperature, or other factors. But, the implementation of the level detectors 100-1 to 100-n is not limited to such, but can be made using other means.

The operation of the above-constructed charge pump device 500 usable in a semiconductor memory according to an embodiment of the present invention is described as follows referring to FIGS. 5A–5C.

Figure 5A:
FIGS. 5A–5C illustrate timing graphs for explaining a unit charge pump driven selectively in accordance with the device state in FIG. 3.
Figure 5B:
Figure 5C:
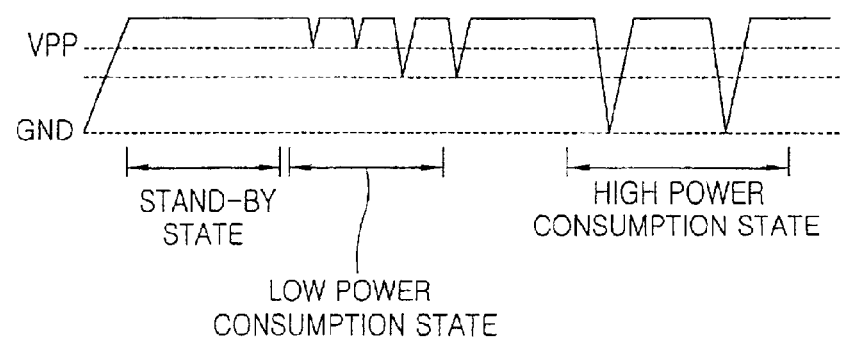

As shown in FIGS. 5A–5B, when a pumping enabling signal PUMP_ON is at a high level by power-on of an apparatus, system or the like memory device associated with the device 500, the multi-level detector 100 outputs first to nth level detection signals DET1 to DETn by comparing a VPP level to the reference voltage VREF. At this time, all of the first to nth level detection signals DET1 to DETn are at a high level since the initial level of the boosted voltage VPP output from the charge pump part 400 is low.

Subsequently, the oscillator 200 generates and outputs a pulse signal PUL in accordance with the high level detection signal DET1. The pulse signal PUL output from the oscillator 200 is then applied to the charge pump part 400 through the logic operation part 300, thereby operating all of the first to nth unit charge pumps 40-1 to 40-n. Thus, the VPP level rises from low to high. Once the level of the boosted voltage VPP rises, the multi-level detector 100 generates the first to nth level detection signals DET1 to DETn that have been switched from a high to low level due to the rising of the boosted voltage VPP. The level detection signals DET1 to DETn at a low level then place the unit charge pumps 40-2 to 40-n in a standby state by reducing the number of the unit charge pumps 40-2 to 40-n that are in operation.

Particularly, at the standby state, the level of the boosted voltage VPP is maintained by operating only the first unit charge pump 40-1, which is possible by designing a level of the divided voltage DIV1 output from the voltage distributor 101 to be lower than the reference voltage VREF based on this formula:

$$DIV1 = VPP*R0/(R0+R1+ \ldots +Rn)$$

where R0, R1 . . . Rn are the values of resistors.

When the associated apparatus (e.g., memory) starts to consume power at an active stage (low-speed operation), a level of the boosted voltage VPP decreases. Once the level of the boosted voltage VFP is decreased, the level of the divided voltage DIV2 to be compared with the reference voltage VREF decreases as well. Then, the second level detection signal DET2 output from the level detector 100-2 is shifted from a low level to a high level, whereby the second unit charge pump 40-2 starts to operate.

Thereafter, if too much power is consumed by the device in the active stage (high-speed operation), the level of the boosted voltage VFP is greatly lowered, whereby other detection signals such as the nth level detection signal DETn output from the level detector 100-*n* is shifted from low to high. In this manner, all of the first to nth level detection signals DET1 to DETn can be selectively switched to a high level, thereby turning on all the unit charge pumps 40-1 to 40-*n*.

By carrying out such procedures repeatedly to drive selectively one, two or more of the plurality of the unit charge pumps in accordance with the amount of power consumed by the apparatus (e.g., memory) or the like associated with the charge pump device 500, the charge pump device according to the present invention maintains the level of the boosted voltage VPP. For example, one unit charge pump 40-1 is driven only at a standby stage, two unit charge pumps 40-1 and 40-2 may be driven at a low power consumption stage, and all or most of the unit charge pumps 40-1 to 40-*n* may be driven at a high power consumption stage.

Accordingly, the charge pump device according to the present invention reduces power consumption by adjusting automatically the number of unit charge pumps in operation in accordance with the power consumption variation of an associated apparatus by detecting a level of a boosted voltage.

Moreover, the present invention decreases noise generated from signal switching due to the reduced size of a pump capacitor in each of the unit charge pumps by varying the number of the unit charge pumps in accordance with the power consumption variation.

The forgoing embodiments are merely exemplary and are not to be construed as limiting the present invention. The present teachings can be readily applied to other types of apparatuses, systems and/or methods. The description of the present invention is intended to be illustrative, and not to limit the scope of the claims. Many alternatives, modifications, and variations will be apparent to those skilled in the art.

What is claimed is:

1. A charge pump circuit for supplying a boosted voltage to a memory device, comprising:
   a charge pump part constructed with first to nth unit charge pumps; and
   a multi-level detector that detects a level variation of the boosted voltage and outputs first to nth level detection signals for selectively driving corresponding individual unit charge pumps, the multi-level detector including:
   a voltage distributor for dividing the boosted voltage into first to nth voltage levels;
   first to nth level detectors for comparing the first to nth voltage levels with a reference level and generating the first to nth level detection signals;
   an oscillator for producing a pulse signal in accordance with the first level detection signal from the first level detector; and
   a logic operation part for logically operating the pulse signal of the oscillator and the second to nth level detection signal from the second to nth level detectors, and outputting first to nth operated signals to the first to nth unit charge pumps.

2. The charge pump device of claim 1, wherein the first unit charge pump is always driven by the level detection signal output from the multi-level detector.

3. The charge pump device of claim 1, wherein the second to nth unit charge pumps are selectively driven in accordance with the level of the boosted voltage.

4. The charge pump device of claim 1, wherein each of the first to nth level detectors includes a differential amplifier.

5. The charge pump device of claim 1, wherein the first voltage level is lower than the reference level.

6. A charge pump device associated with a memory device, comprising:
   a charge pump part including first to nth unit charge pumps to generate a boosted voltage;
   a multi-level detector that detects a level of the boosted voltage and outputs first to nth level detection signals for selectively driving corresponding individual unit charge pumps, wherein the first unit charge pump is always driven by the first level detection signal output from the multi-level detector, and each of the first to nth level detectors is composed of a different amplifier; and
   wherein the second to nth unit charge pumps are selectively driven in accordance with the levels of the second to nth detection signals.

7. The charge pump device of claim 6, wherein the multi-level detector includes:
   a voltage distributor for dividing the boosted voltage into first to nth voltage levels; and
   first to nth level detectors for detecting a plurality of levels of the boosted voltage by comparing the first to nth voltage levels divided by the voltage distributor with a reference level.

8. The charge pump device of claim 7, wherein the first voltage level is lower than the reference level.

* * * * *